Patented Dec. 8, 1936

2,063,542

UNITED STATES PATENT OFFICE 2,063,542

DIENE RESIN

Carleton Ellis, Montclair, N. J., assignor to Ellis-Foster Company, a corporation of New Jersey No Drawing. Application May 20, 1932, Serial No. 612,648

28 Claims. (Cl. 260—8)

This invention relates to resinous products resulting from the interaction of certain resin acids, a polybasic acid and a polyhydric alcohol. In particular it relates to resins obtained from maleic or fumaric acid, rosin and glycerol, with or without another polybasic acid. It is a continuation in part of my copending application Serial No. 609,136, filed December 26, 1922, now Patent No. 1,897,977. In that prior application there is disclosed the polyhydric alcohol polybasic acid resins, including natural resin polyhydric alcohol polybasic acid combinations, maleic acid also being specifically enumerated therein. The claims of the granted patent are directed to these organic carboxylic acid polyhydric alcohol reaction products including accelerators of conversion to products of lowered fusibility and/or solubility.

According to the above application, when the glycerol is not used in excess, there is a certain point in the resinification reaction between polybasic acids and polyhydric alcohols at which the mass suddenly changes from a liquid to a spongy solid. Thus 3 mols of phthalic anhydride to 2 mols of glycerol when heated to 235–240° C. suddenly become transformed to a solid which is insoluble in ordinary solvents. Presence of rosin changes the solidification point. That is, the addition of 25 per cent of rosin raises the solidification point to 248° C.

Resins from maleic and fumaric acid likewise harden but at temperatures different from phthalic resins. In the final heat-hardened form the resins are insoluble in ordinary solvents. However, when the reaction is interrupted before this final form is reached, they may be dissolved in various solvents such as nitrocellulose solvents, benzol or a mixture of benzol and alcohol. The solutions may be used to impregnate fillers for use as molding compositions, or they may be used in coating compositions; for example they may be mixed with solutions of nitrocellulose.

As noted in Serial No. 609,136, there is a difference in the properties of resins made from phthalic anhydride and those from maleic or fumaric acid as regards temperature of solidification. Other points of difference will be more fully described in the examples which follow.

*Example 1.*—444 parts phthalic anhydride (3 mols), 184 parts glycerol (2 mols) and 157 parts rosin (25 per cent of the mixture of phthalic and glycerol) were heated gradually. When the temperature reached 250° C. the melt became very viscous and full of bubbles, and heating was discontinued. The resin thus obtained was very hard and tough. It was practically insoluble in all solvents. When heated it softened but did not melt.

A similar mixture from which rosin was omitted was heated under the same conditions as the rosin phthalic glyceride resin. The mass solidified when the temperature reached 240° C. When the amount of rosin is increased the point of solidification is raised.

50 parts of the rosin phthalic glyceride described above, were heated with 200 parts of a 20 per cent solution of caustic soda until saponified. The hot solution was acidified by addition of hydrochloric acid which precipitated a gummy mass that solidified on cooling. The precipitate was removed, ground to a fine powder and washed repeatedly with water to remove all traces of water-soluble acid. It was then dissolved in a dilute solution of caustic soda to form a soapy solution. When acidified a flocculent precipitate was formed which was filtered off, washed and dried. Acid number 145; softening point (ball and ring method) 83° C.

The rosin which was used in the above resin had an acid number of 150 and a softening point of 84° C. Thus, from a rosin phthalic glyceride resin the rosin may be recovered in relatively unchanged form by saponification.

*Example 2.*—348 parts maleic acid (3 mols), 184 parts glycerol (2 mols) and 132 parts rosin (25 per cent of the total amount of acid and glycerol) were heated gradually. The mixture was cloudy at first but as the temperature rose to about 210° C. it became clear. At 228° C. gelatinization to a vesiculated mass occurred. The resin thus obtained was very hard and tough. It was insoluble in all solvents and infusible, but softened somewhat when heated.

In the above example solidification occurred when the temperature reached 228° C., whereas in the case of phthalic anhydride and rosin, the point was 250° C. A mixture of 3 mols maleic acid and 2 mols glycerol, heated under the same conditions solidified at 220° C. in comparison with 240° C. for phthalic glyceride.

50 parts of the rosin maleic glyceride were boiled with 200 parts of a 20 per cent solution of caustic soda until saponified, and the alkaline solution was acidified by means of hydrochloric acid causing a gummy precipitate to form, which solidified when cold. The solidified mass was finely ground and washed thoroughly with water so as to remove all water-soluble acids. It was then further purified by dissolving in a dilute solution of caustic soda. The solution in alkali was clear and limpid, in contrast to the soapy solution formed by rosin. Addition of hydrochloric acid produced a voluminous, almost white, flocculent precipitate which was filtered off, washed and dried. Acid number of the dried material was 287.8; softening point 146° C. It is evident that the material thus obtained is not rosin.

Saponification of a resin formed by heating rosin and maleic acid therefore, does not yield rosin in an unchanged form. Instead a maleic acid-compound of rosin is obtained. The compound differs from ordinary rosin in having a higher softening point, higher acid number and forming solutions in alkalies which are not soapy like rosin solutions.

*Example 3.*—A mixture of 150 parts rosin, 58 parts maleic acid and 46 parts glycerol was heated gradually. Foaming occurred when a temperature of 120° C. was reached and continued up to about 200° C. When the temperature reached 280° C. heating was discontinued. The larger proportion of rosin used in this example retards gelatinization, and permits a high temperature to be used. The product was a hard brittle resin, soluble in toluol, acetone, ethyl acetate and in mixtures of benzol and alcohol.

50 parts of the resin were saponified in the same way as the resin of Example 2. In this case also rosin was not obtained in free form. As with Example 2, a polyhydric acid-compound of rosin was obtained, acid number 285.6; softening point 148° C.

The rosin-maleic acid as obtained by hydrolysis of rosin maleic glyceride is formed by the so-called diene reaction. Rosin contains two conjugated double bonds and maleic acid reacts therewith through 1-4 addition, forming a tribasic acid. Therefore hydrolysis of a resin produced by simultaneous reaction of rosin or a rosin derivative and maleic acid or other acid or anhydride reacting in the same way as maleic, does not yield rosin but an organic acid-compound of rosin. The polybasic acid compound of rosin has a high softening point and the formation or presence of such a compound in a resin results in a high softening point for the resin.

In the above examples rosin-maleic acid has been obtained by simultaneous reaction of rosin, maleic acid and glycerol. However, rosin-maleic or -fumaric acid also may be obtained merely by heating rosin with the acid. That is, it may be formed in absence of glycerol. Also it may be produced in a combined form by treating a rosin resin with maleic acid or anhydride, or fumaric acid as will be hereinafter shown.

Thus, rosin heated with 30 per cent of maleic acid gives a rosin-maleic compound of softening point 133° C. and acid number 245. Rosin heated with 30 per cent of fumaric acid gives a rosin-fumaric compound of softening point 145° C. The degree of hardening of the rosin may be controlled not only by the amount of acid but also by the particular kind of acid. Fumaric acid produces a greater hardening effect than does maleic.

Maleic and fumaric acids not only react with rosin in a free state or in presence of glycerol, but also they react with the rosin-residue of rosin esters, rosin phthalic glyceride, phenol-formaldehyde-rosin esters and other rosin-resins, resulting in a hardened resin which does not yield ordinary rosin on hydrolysis. It is a preferred object of this invention to prepare rosin-resins of increased softening point.

*Example 4.*—Rosin glyceride of softening point 92° C. was heated to 250° C. with 20 per cent of maleic acid. The product was a clear, hard, brittle resin of softening point 142° C.; soluble in toluol, acetone, ethyl acetate, and in mixtures of alcohol and benzol. It was compatible with nitrocellulose.

When 10 per cent maleic acid was used the softening point of the product was 122° C.; and when 10 per cent of fumaric acid was employed the softening point was 133° C. Thus fumaric acid produces resins of higher softening point than does maleic acid.

*Example 5.*—100 parts of the rosin ester-compound in which 20 per cent of maleic acid was used was heated at 250° C. for 1 hour with 15 parts of glycerol. There was formed a clear hard resin of acid number 54 and softening point 149° C. It was soluble in various organic solvents with the exception of alcohol and mineral spirits. Saponification of this resin yields a salt of rosin-maleic acid; that is, the resin is incompletely saponified.

*Example 6.*—A rosin phthalic glyceride was made by heating a mixture of 100 parts rosin, 21 parts phthalic anhydride and 24 parts glycerol gradually to 290° C. The softening point of the resin was 102° C.

(a) When the rosin phthalic glyceride was heated to 250° C. with 20 per cent of maleic acid, the softening point was raised to 124° C.

(b) When heated to 300° C. with 10 per cent of fumaric acid instead of maleic acid the softening point became 135° C. 20 per cent of fumaric acid caused gelatinization of the resin.

(c) When the product of paragraph (a) was heated at 260° C. for 40 minutes, with 20 per cent of its weight of glycerol, the softening point became 129° C., and acid number 52. The product was soluble in toluol and acetone.

The high acid number of rosin-fumaric or -maleic acid may be reduced by esterification with glycerol. In place of glycerol there may be used glycols, polyglycols, polyglycerols, pentaerythritol, sorbitol or alkylene oxides.

*Example 7.*—100 parts rosin and 26 parts maleic acid were heated gradually to 250° C. The rosin-maleic compound thus formed had a softening point of 125° C. and acid number 298. 20 per cent of glycerol was added and the mixture was heated at 260° C. for 40 minutes and then the temperature was taken to 290° C. The glyceride had a softening point of 129° C. and acid number of 53. It was soluble in toluol, acetone, ethyl acetate and tung oil; insoluble in alcohol. Prolonged heating caused the resin to gelatinize.

To recapitulate, this invention in its preferred form embraces synthetic resins having a basis of rosin which on hydrolysis yield a polybasic acid-compound of rosin such as rosin-maleic or -fumaric acids which has a higher softening point than rosin. The formation of these polybasic acid-compounds of rosin results in resins of higher softening point than is obtained by use of phthalic acid and the like, which do not react according to the diene synthesis. The polybasic acid-compounds of rosin are formed not only in the presence of glycerol but also when a resin containing rosin or other natural resin containing conjugated double bonds, is treated with an α, β-unsaturated acid. The rosin-polybasic acid compounds may be isolated by treatment of the alkali-salt which is produced when the resin is saponified.

The term "rosin type natural resin" is used herein to designate a natural resin which like rosin contains conjugated double bonds, and is reactive with an alpha-beta unsaturated organic acid.

What I claim is:

1. A resinous product formed by simultaneous reaction of natural resin, an alpha-beta unsaturated organic polybasic acid and a polyhydric alcohol, which on saponification yields polyhydric alcohol and a salt of a polybasic acid-compound of natural resin, the natural resin containing conjugated double bonds.

2. A resinous product formed by simultaneous reaction of rosin, an alpha-beta unsaturated organic polybasic acid and a polyhydric alcohol, which on hydrolysis yields a rosin-compound of higher softening point than rosin.

3. A resinous product according to claim 1, in which the polybasic acid is maleic acid.

4. A resinous product according to claim 1, in which the polybasic acid is fumaric acid.

5. A solution of a resinous product according to claim 1, in a hydrocarbon solvent for the resinous product.

6. A rosin alpha-beta unsaturated dibasic organic acid-glyceride which on hydrolysis yields a tribasic acid, said product yielding on saponification, a rosin dibasic organic acid reaction product of acid number substantially higher than rosin.

7. A composition containing a rosin ester hardened by treatment with an α, β-unsaturated organic dibasic acid.

8. A composition containing rosin glyceride hardened by treatment with maleic acid.

9. A composition containing rosin glyceride hardened by treatment with fumaric acid.

10. A composition containing rosin phthalic glyceride hardened by treatment with an α, β-unsaturated organic acid.

11. A composition containing a natural resin ester reaction product with an alpha-beta unsaturated polybasic organic acid, the natural resin containing conjugated double bonds, and the reaction product yielding on saponification a natural resin organic acid reaction product of acid number substantially higher than rosin.

12. A composition containing a natural resin reaction product with an alpha-beta unsaturated polybasic organic acid, the natural resin containing conjugated double bonds, and the reaction product having an acid number substantially higher than rosin.

13. A composition containing a natural resin ester reaction product with an acid selected from the group consisting of fumaric and maleic acids, the natural resin containing conjugated double bonds, and the reaction product yielding on saponification a natural resin organic acid reaction product of acid number substantially higher than rosin.

14. A composition containing a natural resin reaction product with an acid selected from the group consisting of fumaric and maleic acids, the natural resin containing conjugated double bonds, and the reaction product having an acid number substantially higher than rosin.

15. A product as set forth in claim 11 modified by reaction with a polyhydric alcohol.

16. The process of producing reaction products which comprises heating a natural resin ester with an alpha-beta unsaturated polybasic organic acid, the natural resin containing conjugated double bonds, and the reaction product yielding on saponification a natural resin organic acid reaction product of acid number substantially higher than rosin.

17. The process of preparing reaction products which comprises heating together a natural resin with an alpha-beta unsaturated polybasic organic acid, the natural resin containing conjugated double bonds, and the reaction product having an acid number substantially higher than rosin.

18. The process of preparing reaction products which comprises heating together a natural resin polyhydric alcohol-polybasic acid resin with an alpha-beta unsaturated polybasic organic acid, the natural resin containing conjugated double bonds, and the reaction product yielding on saponification a natural resin organic acid reaction product of acid number substantially higher than rosin.

19. The process of preparing reaction products which comprises heating together a natural resin with an acid selected from the group consisting of fumaric and maleic acids, and further treating said reaction products by heat treatment with a polyhydric alcohol, the natural resin containing conjugated double bonds.

20. The process of preparing reaction products which comprises heating together a natural resin polyhydric alcohol-polybasic acid resin with an acid selected from the group consisting of fumaric and maleic acids, and further treating said reaction products by heating the same with a polyhydric alcohol, the natural resin containing conjugated double bonds.

21. The process of recovering reaction products which comprises simultaneously heating together a natural resin, an alpha-beta unsaturated organic polybasic acid and a polyhydric alcohol, saponifying the resulting reaction product, and recovering the alpha-beta unsaturated organic polybasic acid reaction product of the natural resin from the saponification product, the natural resin containing conjugated double bonds.

22. A resinous condensation product containing rosin maleic glyceride.

23. A varnish base of rosin maleic glyceride and a drying oil.

24. A varnish base of a natural resin polyhydric alcohol reaction product with an alpha beta unsaturated polybasic organic acid, and tung oil, the natural resin containing conjugated double bonds.

25. A composition containing reaction products of a polyhydric alcohol with the reaction product of an alpha-beta unsaturated polybasic organic acid, and an unsaturated organic substance reactive with the alpha-beta unsaturated polybasic organic acid to produce a diene condensation product.

26. A composition containing reaction products of a polyhydric alcohol with the heat reaction product of a substance yielding an alpha-beta unsaturated organic compound, and an unsaturated monobasic acid reactive with the alpha-beta unsaturated organic compound.

27. A modified natural resin adapted for use in coating compositions which comprises the reaction product of rosin and maleic acid, having an acid number substantially higher than rosin.

28. A modified natural resin adapted for use in coating compositions comprising the reaction product of rosin and maleic anhydride, having an acid number substantially higher than rosin.

CARLETON ELLIS.

Disclaimer 2,063,542.—*Carleton Ellis*, Montclair, N. J. DIENE RESIN. Patent dated Dec. 8, 1936. Disclaimer filed May 25, 1950, by the assignee, *Ellis-Foster Company*.

Hereby enters this disclaimer to claims 1 to 11 inclusive, and 13, 15, 16, 18, and 20 to 26, inclusive, of said patent.

[*Official Gazette June 20, 1950.*]